(12) United States Patent
Baek et al.

(10) Patent No.: US 11,358,114 B2
(45) Date of Patent: Jun. 14, 2022

(54) CONTINUOUS TUBULAR REACTOR AND METHOD OF OPERATING THE SAME

(71) Applicant: SAMSUNG ELECTRO-MECHANICS CO., LTD., Suwon-si (KR)

(72) Inventors: Changyeon Baek, Suwon-si (KR); Won Sik Jung, Suwon-si (KR); Jin Seong Kim, Suwon-si (KR); Hyojin Kim, Suwon-si (KR); Gahee Hyun, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 131 days.

(21) Appl. No.: 16/834,173

(22) Filed: Mar. 30, 2020

(65) Prior Publication Data
US 2021/0205777 A1 Jul. 8, 2021

(30) Foreign Application Priority Data
Jan. 7, 2020 (KR) .................. 10-2020-0001871

(51) Int. Cl.
*B01J 4/00* (2006.01)
*B01J 4/02* (2006.01)
(Continued)

(52) U.S. Cl.
CPC .............. *B01J 19/1812* (2013.01); *B01J 4/02* (2013.01); *B01J 19/0013* (2013.01); *B01J 19/02* (2013.01);
(Continued)

(58) Field of Classification Search
CPC . B01J 4/00; B01J 4/02; B01J 6/00–002; B01J 8/00; B01J 8/08; B01J 19/00–0013; B01J 19/0053; B01J 19/006; B01J 19/02; B01J 19/18; B01J 19/1812; B01J 19/28; B01J 2208/00; B01J 2208/00008; B01J 2208/00017; B01J 2208/00389; B01J 2208/00415; B01J 2208/00433; B01J 2208/00442; B01J 2208/0046; B01J 2219/00; B01J 2219/00002;
(Continued)

(56) References Cited

U.S. PATENT DOCUMENTS 3,836,336 A * 9/1974 Yasui ........................ C08B 9/04
422/134
3,932,313 A * 1/1976 Reynolds ............ C04B 35/4682
252/520.21

(Continued)

FOREIGN PATENT DOCUMENTS

| KR | 10-2009-0115605 A | 11/2009 |
|---|---|---|
| KR | 10-2009-0120478 A | 11/2009 |
| KR | 10-2015-0118600 A | 10/2015 |

*Primary Examiner* — Natasha E Young
(74) *Attorney, Agent, or Firm* — Morgan, Lewis & Bockius LLP (57) ABSTRACT

A continuous tubular reactor includes a rotary reaction tube having a reactant inlet and a product outlet, and including a ceramic; a heating device disposed outside the rotary reaction tube; and an angle adjuster adjusting an angle of a rotation axis of the rotary reaction tube. The angle of the rotation axis is 75° or less with respect to a horizontal surface.

19 Claims, 12 Drawing Sheets

(51) Int. Cl.
  *B01J 8/00* (2006.01)
  *B01J 8/08* (2006.01)
  *B01J 19/00* (2006.01)
  *B01J 19/02* (2006.01)
  *B01J 19/18* (2006.01)
  *B01J 19/28* (2006.01)
  *C01G 23/00* (2006.01)

(52) U.S. Cl.
  CPC ... *C01G 23/006* (2013.01); *B01J 2219/00033* (2013.01); *B01J 2219/00087* (2013.01); *B01J 2219/0263* (2013.01); *C01P 2004/01* (2013.01)

(58) Field of Classification Search
  CPC .... B01J 2219/00027; B01J 2219/00033; B01J 2219/00049; B01J 2219/00051; B01J 2219/00074; B01J 2219/00087; B01J 2219/00761; B01J 2219/00763; B01J 2219/00765; B01J 2219/00768; B01J 2219/0077; B01J 2219/00772; B01J 2219/00777; B01J 2219/02; B01J 2219/025; B01J 2219/0263; B01J 2219/18; B01J 2219/187; C01G 23/00; C01G 23/003; C01G 23/006; C01P 2004/01
  See application file for complete search history.

(56) References Cited

U.S. PATENT DOCUMENTS

| | | | | |
|---|---|---|---|---|
| 4,639,217 A * | 1/1987 | Adams | ................. | F27B 7/04 110/226 |
| 9,624,439 B2 * | 4/2017 | Bakaya | ................. | C10B 47/48 |
| 2010/0008830 A1 | 1/2010 | Cavagila et al. | | |

* cited by examiner

CONTINUOUS TUBULAR REACTOR AND METHOD OF OPERATING THE SAME

CROSS-REFERENCE TO RELATED APPLICATION(S)

This application claims benefit of priority to Korean Patent Application No. 10-2020-0001871 filed on Jan. 7, 2020 in the Korean Intellectual Property Office, the disclosure of which is incorporated herein by reference in its entirety.

TECHNICAL FIELD

The present disclosure relates to a continuous tubular reactor and a method of manufacturing barium titanate using the same.

BACKGROUND

Perovskite-type titanate compounds such as barium titanate are widely used in fields including equipment such as semiconductor devices and piezoelectric devices. As a method of manufacturing such a titanic acid compound, there is a dry synthesis method such as a solid phase method and a wet synthesis method such as a sol-gel method, a hydrothermal method, and the like.

In recent years, as miniaturization and increases in capacity through a dielectric constant composition, dielectric thinning, high lamination, low-temperature plasticization, high frequency, high performance, and the like, of multilayer ceramic capacitors (MLCC), it is necessary to manufacture a titanic acid compound having various physical properties such as high purity/composition uniformity, fine grain/size uniformity, non-aggregation/high dispersion.

In general, titanic acid compounds having a fine size of less than 150 nm have been synthesized by using a wet synthesis method, especially a hydrothermal method. However, in the case of such a wet synthesis method, hydroxyl groups are trapped inside a crystal lattice of particles during synthesis, which may cause defects in the particles during heat-treatment. In particular, as the particles are atomized, there is a problem in that a proportion of defects in the particles relatively increases, causing deterioration of a dielectric constant.

Therefore, as a method of not leaving such hydroxyl groups, particulate synthesis through a solid phase method has attracted attention. However, in the solid phase method, a non-uniform reaction due to a difference in an amount of gas emissions and the high particle size distribution due to a thermal gradient inside a container is a main problem, and this problem is required to be solved.

SUMMARY

An aspect of the present disclosure is to provide a tubular reactor capable of inducing a uniform reaction and a method of manufacturing barium titanate using the same.

Another aspect of the present disclosure is to provide a tubular reactor capable of performing a stable heat-treatment process and a method of manufacturing barium titanate using the same.

Another aspect of the present disclosure is to provide a tubular reactor capable of manufacturing barium titanate having a high uniformity and a method of manufacturing barium titanate using the same.

According to an aspect of the present disclosure, a continuous tubular reactor may include: a rotary reaction tube having a reactant inlet and a product outlet, and containing ceramic; a heating device disposed outside the rotary reaction tube; and an angle adjuster adjusting an angle of a rotation axis of the rotary reaction tube. The angle of the rotation axis is 75° or less with respect to a horizontal surface.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings. It is not intended to limit the techniques described herein to specific embodiments, and it should be understood to include various modifications, equivalents, and/or alternatives to the embodiments of the present disclosure. In connection with the description of the drawings, similar reference numerals may be used for similar components.

In the drawings, for clarity of description, parts irrelevant to the description may be omitted, and thicknesses of elements may be magnified to clearly represent layers and regions. Components having the same functions within a scope of the same idea may be described using the same reference numerals.

In the present specification, expressions such as "having", "may have", "include" or "may include" may indicate a presence of corresponding features (e.g., components such as numerical values, functions, operations, components, or the like), and may not exclude a presence of additional features.

In the present specification, expressions such as "A or B", "at least one of A or/and B" or "one or more of A or/and B", and the like, may include all possible combinations of items listed together. For example, "A or B", or "at least one of A or B" may refer to all cases including (1) at least one A (2) at least one B, or (3) both at least one A and at least one B.

In the drawings, an X direction may be defined as a first direction, an L direction or a longitudinal direction, a Y direction may be defined as a second direction, a W direction or a width direction, and a Z direction may be defined as a third direction, a T direction or a thickness direction.

Hereinafter, a continuous tubular reactor according to an embodiment of the present disclosure will be described in detail with reference to FIGS. 1A to 4.

Referring to the drawings, a continuous tubular reactor 10 according to an embodiment of the present disclosure may include a rotary reaction tube 100 having a reactant inlet and a product outlet, and containing silicon; a heating device 13 disposed outside the rotary reaction tube 100; and an angle adjuster 12 for adjusting an angle of a rotation axis of the rotary reaction tube 100.

In this case, the angle of the rotation axis of the rotary reaction tube 100 may be 75° or less with respect to a horizontal surface. The angle of the rotary reaction tube 100 with respect to the horizontal surface may be adjusted according to a type of chemical reaction to be applied to the reactor according to the present disclosure. A lower limit of the angle of the rotation axis of the rotary reaction tube 100 with respect to the horizontal plane is not particularly limited, but may be, for example, 0° or more and exceed 0°, but is not limited thereto. The angle of the rotation axis of the rotary reaction tube 100 with respect to the horizontal plane can be adjusted by the angle adjuster 12. The angle adjuster 12 of the present embodiment may be a device for adjusting the angle of the rotary reaction tube 100 by adjusting a height of the reactant inlet in the Z direction, but is not limited thereto, and may include all shapes capable of adjusting the angle of the rotary reaction tube 100.

The continuous tubular reactor of the present disclosure may include a rotary reaction tube including a ceramic. The rotary reaction tube includes a ceramic, which may mean that the rotary reaction tube is manufactured from a compound including ceramic, or may mean that at least a portion of components of a configuration of the rotary reaction tube includes a ceramic.

In one example, the rotary reaction tube according to the present disclosure may include one or more selected from a group consisting of oxide-based ceramics, nitride-based ceramics, carbide-based ceramics, fluoride-based ceramics and boride-based ceramics. Specific examples of the oxide-based ceramics may be $Al_2O_3$, $TiO_2$, $SiO_2$, $Cr_2O_3$, $ZrO_2$, $Y_2O_3$ or MgO, and examples of the nitride-based ceramics may be TiN, TaN, AlN, BN, $Si_3N_4$, $HfH_2$ or NbN. However, the present disclosure is not limited thereto. In addition, examples of the carbide-based ceramics may be, TiC, WC, TaC, $B_4C$, SiC, HfC, ZrC, VC, or $Cr_3C_2$, examples of fluoride-based ceramics may be, LiF, $CaF_2$, $BaF_2$ or $YF_3$, and examples of boride-based ceramics may be, $TiB_2$, $ZrB_2$, $HfB_2$, $VB_2$, $TaB_2$, $NbB_2$, $W_2B_5$, $CrB_2$, or $LaB_6$, but are not limited thereto. In one example, an inner wall of the continuous tubular may include one or more of the above-described materials. In another example, at least an inner wall of the continuous tubular may include quartz. Since the continuous tubular reactor of the present disclosure includes the ceramic component, it is possible to prevent corrosion due to an intermediate generated during a production reaction of barium titanate, and the like described below, and to prevent adhesion to an inside of the tube even during a high-temperature calcination process, thereby enabling a stable heat-treatment.

In an embodiment of the present disclosure, the rotary reaction tube of the continuous tubular reactor according to the present disclosure may be provided with a blade. In this case, the blade may be attached to an inner wall of the rotary reaction tube. The position of the blade attached to the inner wall of the rotary reaction tube may be changed as the rotary reaction tube rotates, it is possible to stir evenly reactive materials in the rotary reaction tube.

Figure 3:
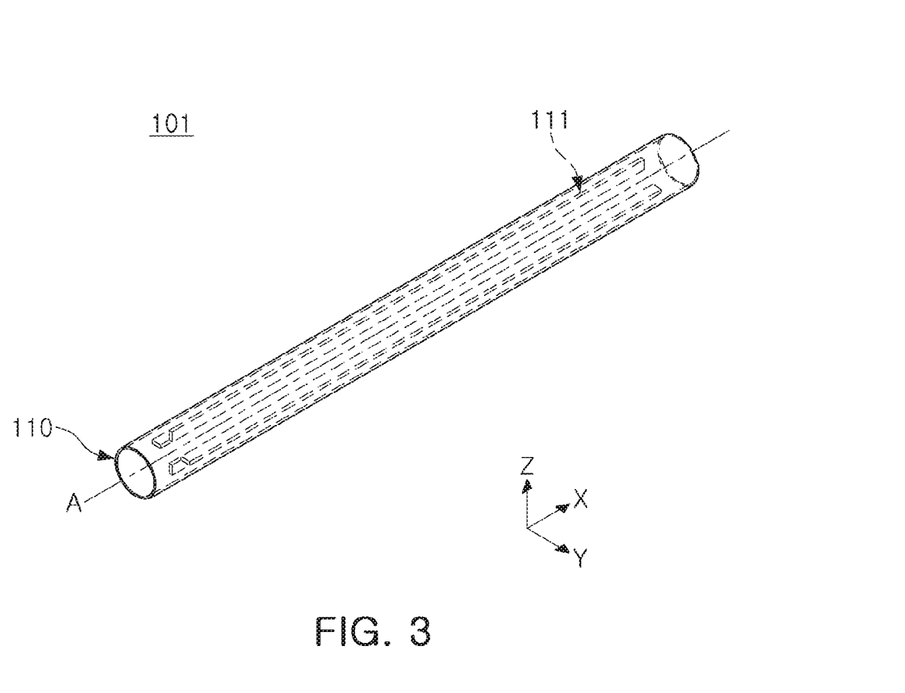
FIG. 3 is a schematic perspective view illustrating a rotary reaction tube according to an embodiment of the present disclosure.
Figure 4:
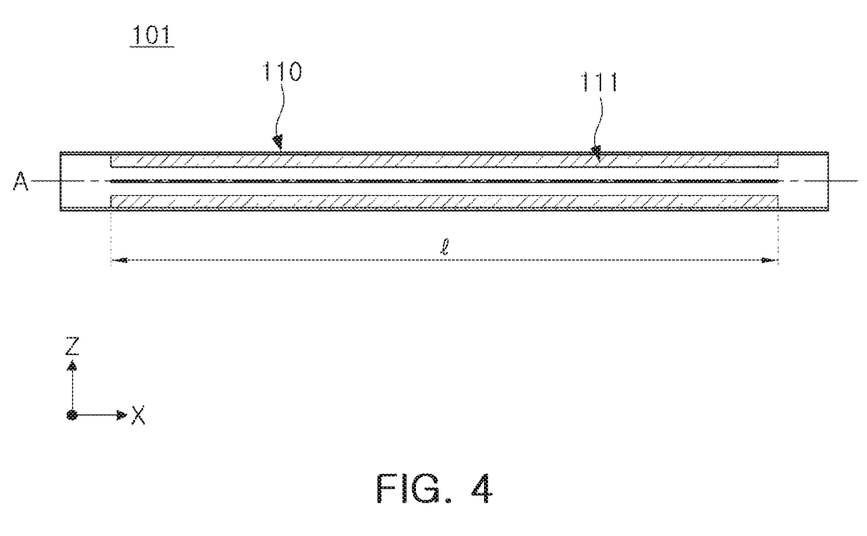
FIG. 4 is a cross-sectional view of FIG. 3.
Figure 5:
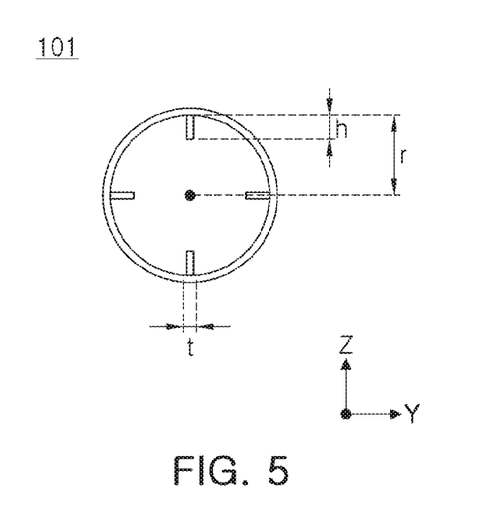
FIG. 5 is a cross-sectional view of FIG. 3.

FIGS. 3 to 5 are schematic diagrams illustrating a rotary reaction tube applied to the continuous reactor according to the present disclosure. Referring to FIGS. 3 to 5, a rotary reaction tube 101 of the present disclosure may have a blade 111 attached to an inner wall of a reaction tube body 110. A material of the blade 111 is not particularly limited, but, for example, may be made of the same material as the rotary reaction tube.

A length (l) of the blade 111 is not particularly limited. As will be described later, when the plurality of blades 111 are disposed along the inner wall of the rotary reaction tube 101, the length (l) of the blade 111 may have a very small value as compared to the rotary reaction tube 101, and when the blade 111 has a spiral shape, or the like, the length (l) of the blade 111 may be a very large value compared to the length of the rotary reaction tube 101.

In one example, a ratio (h/r) of a height h of the blade 111 to a radius r of an inner diameter of the rotary reaction tube 101 of the present disclosure may be 0.01 or more. The ratio (h/r) may be 0.01 or more, 0.02 or more, 0.03 or more, 0.04 or more, or 0.05 or more, and an upper limit thereof is not particularly limited, but may be, for example, less than 0.5. The reaction material can be efficiently stirred by making the ratio (h/r) of the height h of the blade 111 to the radius r of the inner diameter of the rotary reaction tube 101 to satisfy the above range.

Figure 6:
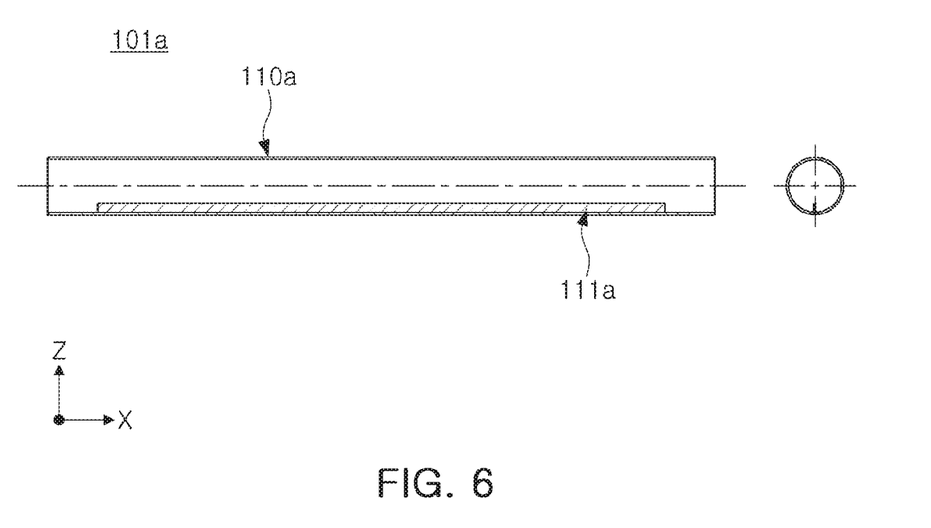
FIGS. 6 to 18 are schematic side surface views illustrating a rotary reaction tube according to various embodiments of the present disclosure.
Figure 9:
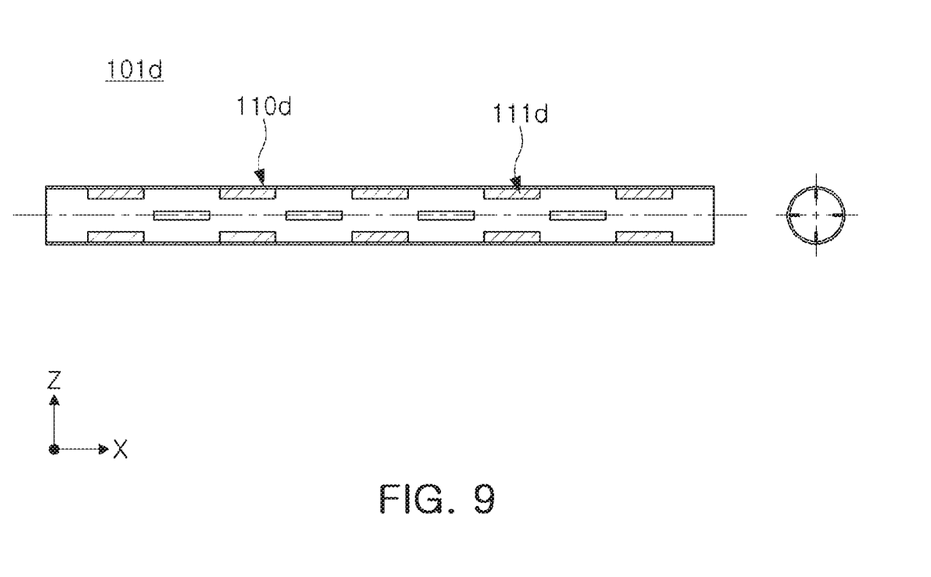
Figure 10:
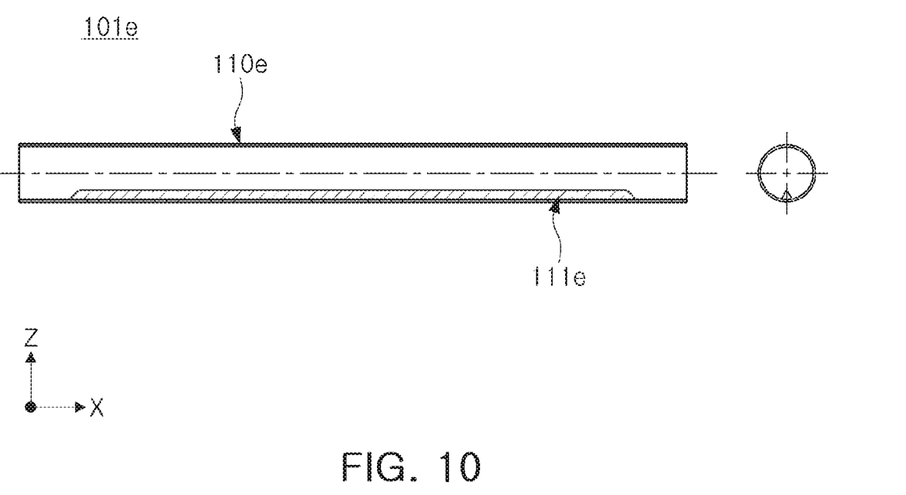

FIGS. 6 to 18 illustrate various modification examples of a blade according to an embodiment of the present disclosure. FIGS. 6 to 18 illustrate various modification examples of a blade according to an embodiment of the present disclosure. In the present specification, an arrangement of a blade may be based on a manner in which the blade is attached to a reaction tube body, and may be based on a shape when the blade attached to the reaction tube body when viewed from an outside. Referring to FIGS. 6 and 10, the blades 111a and 111e may be attached to internal walls of reaction tube bodies 110a and 110e. When the blades 111a and 111e attached to the inner walls of the reaction tube bodies 110a and 110e are disposed in parallel with the rotation axis A, as the rotary reaction tubes 101a and 101e rotate, a position of the reactant is changed in a Z-axis direction, and again falls toward a lower side of the reaction tube bodies 110a and 110e. Thereby, the reaction materials in the rotary reaction tubes 101a and 101e may be evenly stirred to induce a uniform reaction.

Figure 17:
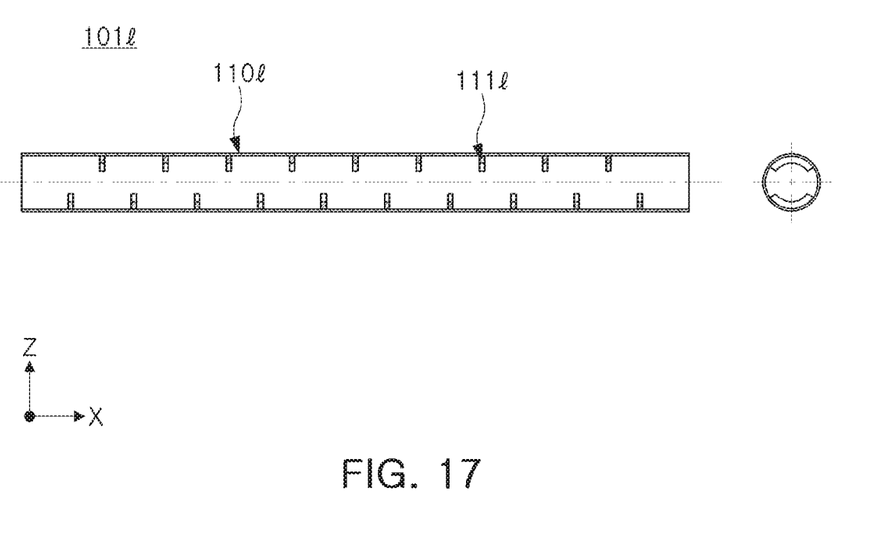
Figure 18:
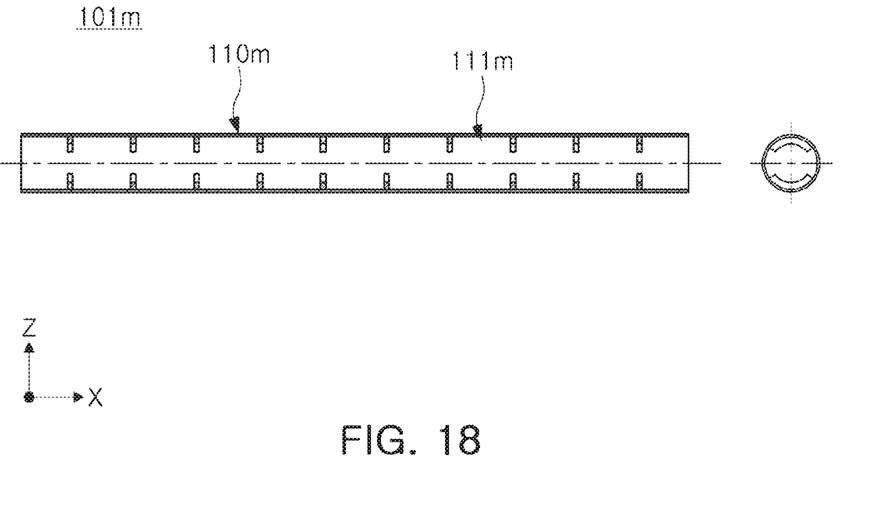
Figure 19:
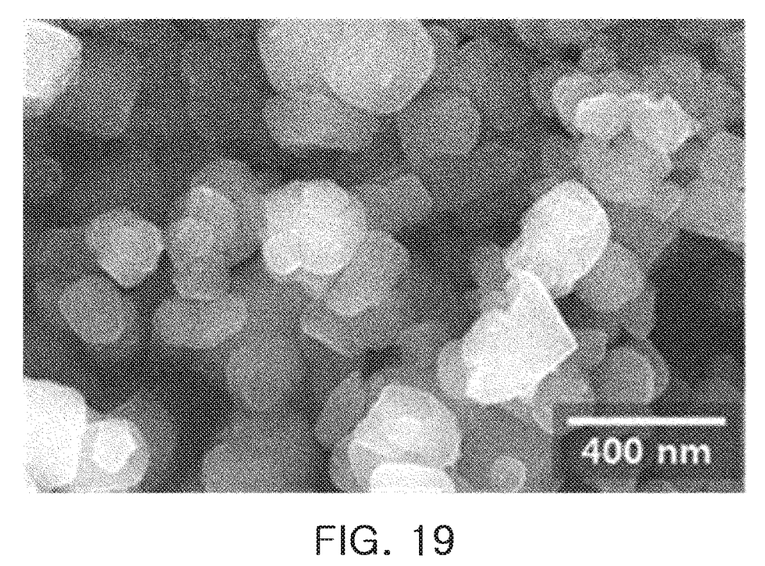
FIG. 19 is a photograph of barium titanate prepared by a solid phase method using a conventional solid phase reactor.
Figure 20:
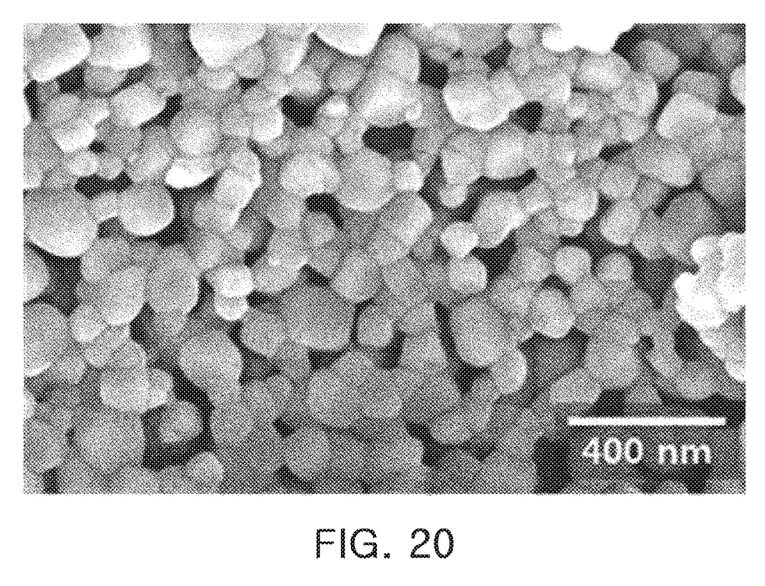
FIG. 20 is a photograph of barium titanate prepared using a continuous tubular reactor according to an embodiment of the present disclosure.

In another example of the present disclosure, blades 111l and 111m inside the rotary reaction tube may be disposed in a direction perpendicular to the rotation axis. FIGS. 17 and 18 are views schematically illustrating rotary reaction tubes 101l and 101m according to the present example. Referring to FIGS. 17 and 18, the blades 111l and 111m of reaction tube bodies 110l and 110m according to the present example may be disposed in a direction, perpendicular to the rotation axis. When the blades 111l and 111m attached to the inner walls of the reaction tube bodies 110l and 110m are disposed to be perpendicular to the rotation axis, reactive materials may fall toward the lower side after collecting a predetermined amount. In this case, the blades 111l and 111m may play a role similar to that of a tray of a distillation column, thereby allowing a uniform reaction by random stirring and heat transfer of the reactive materials.

Figure 15:
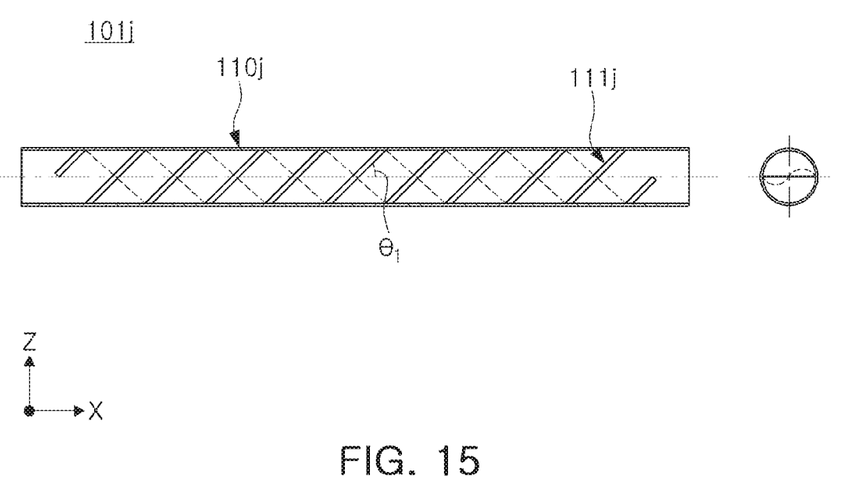
Figure 16:
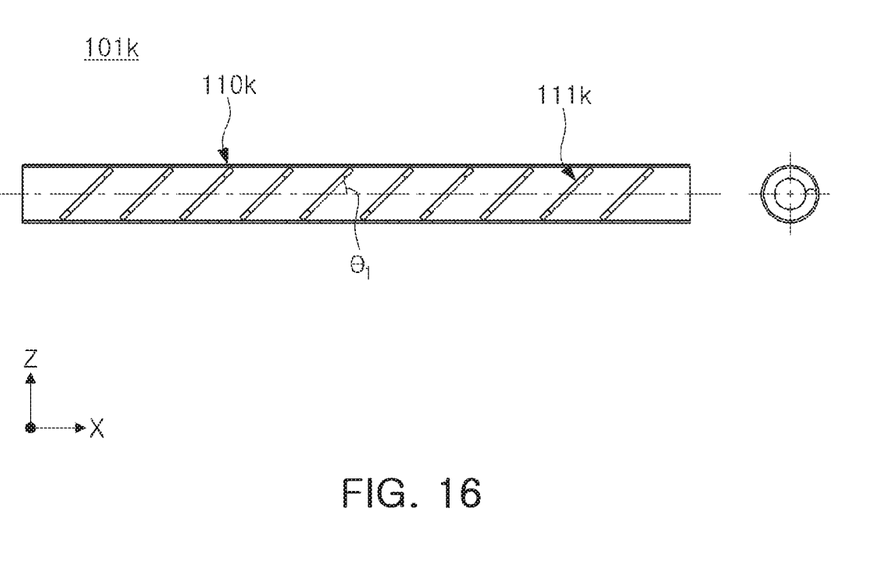

In another example of the present disclosure, blades 111j and 111k of rotary reaction tubes 101k and 101k may be disposed in a spiral direction with regard to the rotation axis. In this case, the blades 111j and 111k may have a constant angle θ1 with respect to the rotation axis. FIGS. 15 and 16 are cross-sectional views of rotary reaction tubes 111*j* and 111*k* according to the present example. Referring to FIG. 15, the blade 111*j* according to an example of the present disclosure may be disposed to extend from any one point of an inner wall of the reaction tube body 110*j* to an opposite side of the inner wall of the reaction tube body 110*j* through a rotation axis. In this case, an extension line of the position in which the blade 111*j* is attached to the inner wall of the reaction tube body 110*j* may form a constant angle θ1 with the rotation axis of the rotary reaction tube 101*j*. In the present example, a height h of the blade 111*j* may have a value twice that of an inner diameter r of the reaction tube body 110*j*, and the rotary reaction tube 101*j* may substantially be divided into two zones by the blade 111*j* along the rotation axis.

In another example, referring to FIG. 16, the blade 111*k* may be attached to the inner wall of the reaction tube body 110*k* while forming a spiral. The angle θ1 is not particularly limited, but may be, for example, may be in a range of 10° to 50°. The blade 111*k* according to the present example may be disposed to have a predetermined height from the inner wall of the reaction tube, and may have a screw shape. The rotary reaction tube 101*k* having the blades 111*k* disposed in the spiral direction may be rotated clockwise or counter-clockwise as necessary. According to the rotation direction of the rotary reaction tube 101*k*, a residence time in which a reactive material remains in the rotary reaction tube 101*k* may be adjusted, thereby minimizing an outflow of unreacted materials or reaction intermediates.

Figure 7:
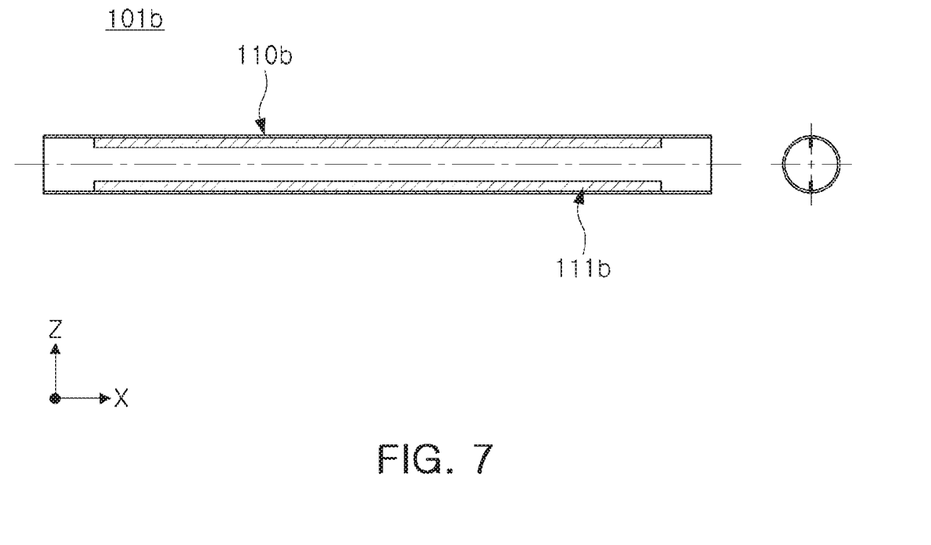
Figure 8:
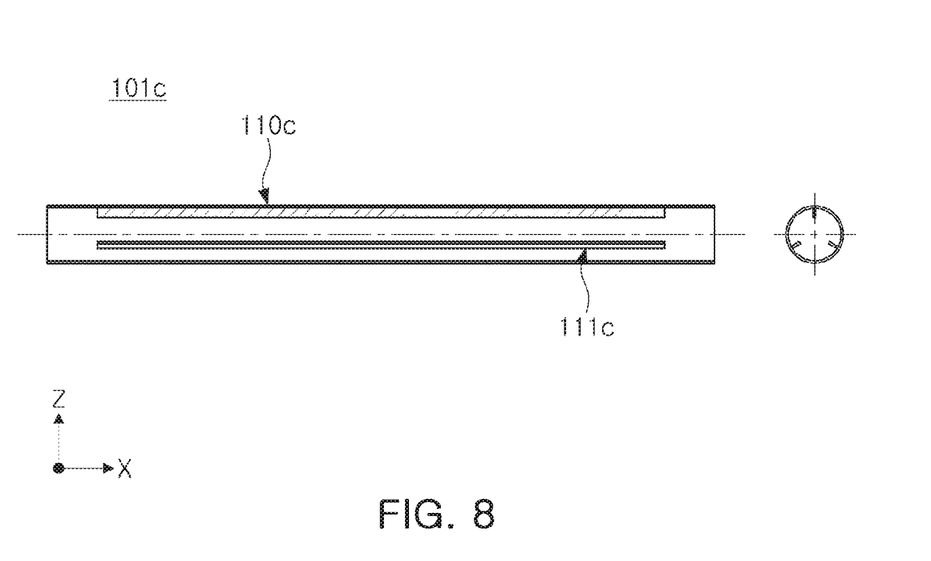
Figure 11:
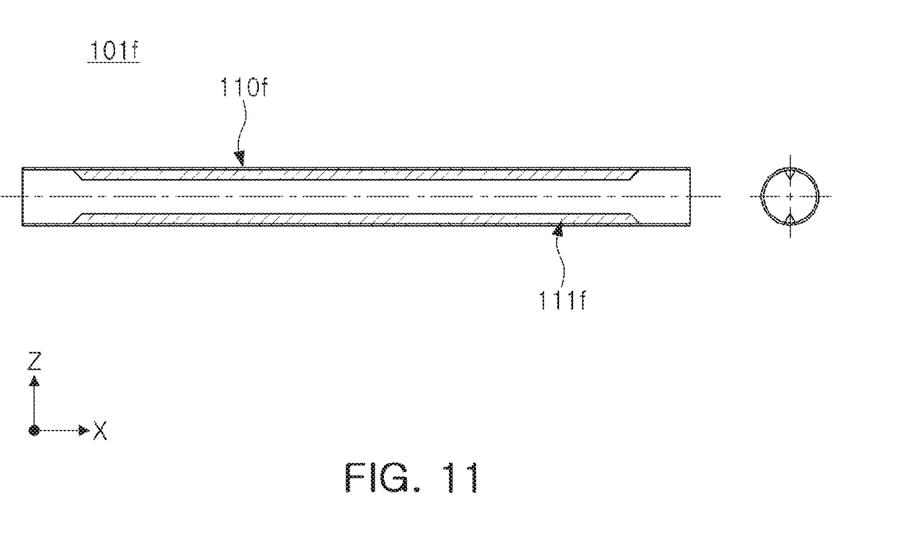
Figure 12:
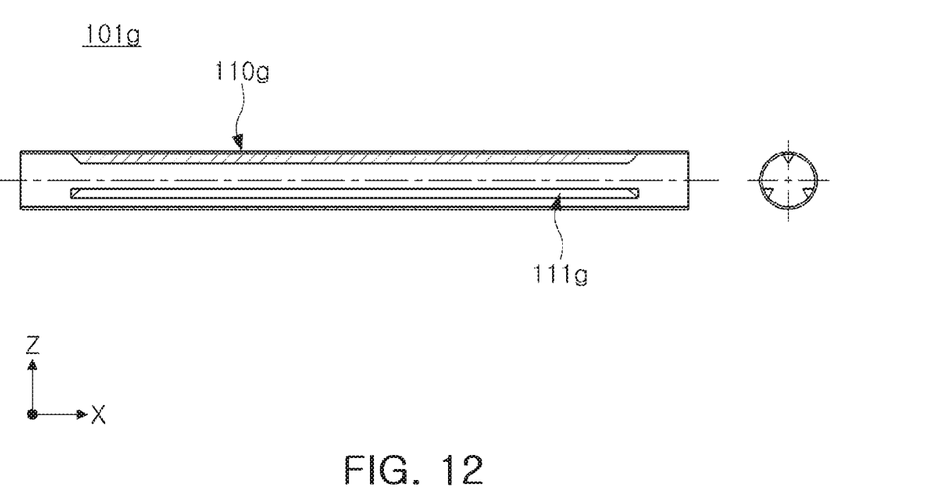
Figure 13:
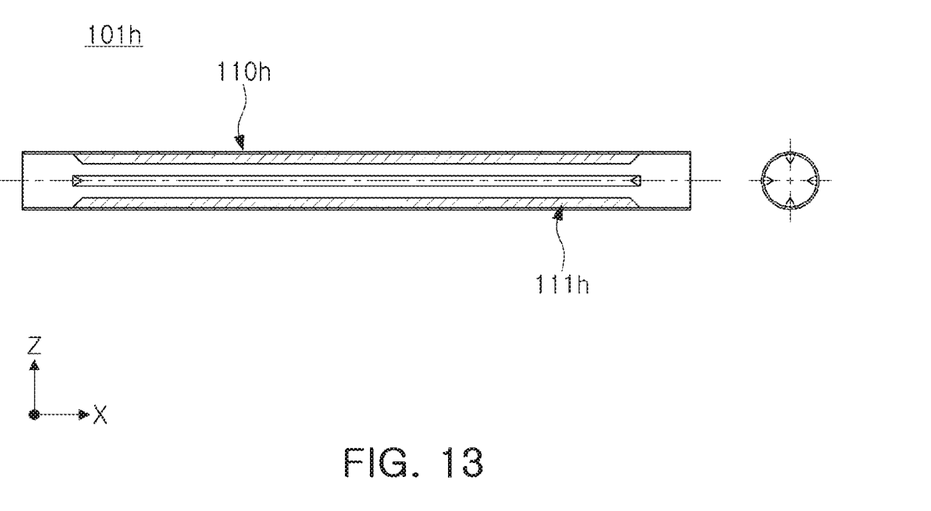
Figure 14:
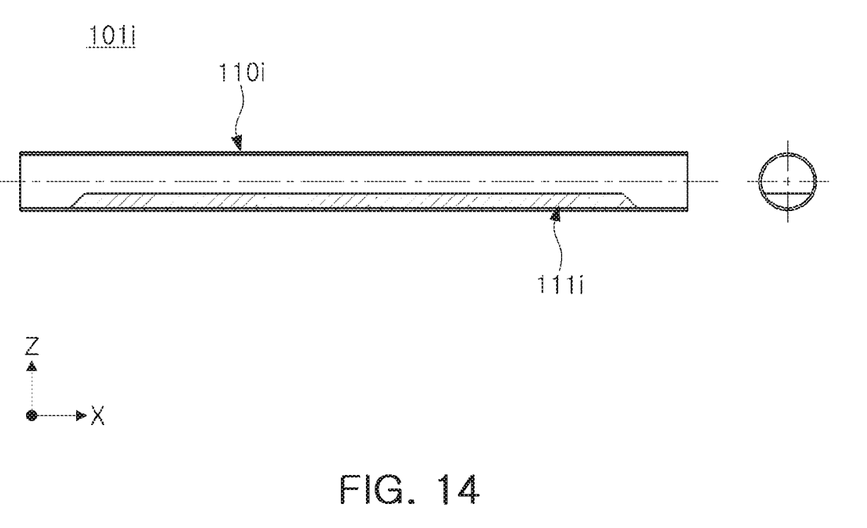

In an embodiment of the present disclosure, the rotary reaction tube according to the present disclosure may include a plurality of blades. Referring to FIG. 3, FIGS. 7 to 9 and FIGS. 11 to 13 are schematic diagrams schematically illustrating rotary reaction tubes 101, 101*b*, 101*c*, 101*d*, 101*f*, and 101*g* in which a plurality of blades 111, 111*b*, 111*c*, 111*d*, 111*f*, 111*g*, and 111*h* are disposed. FIG. 7 shows an example in which two blades 111*b* having a square or round cross section are disposed at an angle of 180°, FIG. 8 shows an example in which three blades 111*c* are formed at an angle of 120°, and FIG. 3 shows an example in which four blades 111 are formed at an angle of 90°, respectively. In addition, FIGS. 11 to 13 illustrate a case in which the shape of the cross-section is triangular in the blade arrangement as in the above example. In addition, FIG. 9 shows an example of a case in which a pair of blades 111*d* forming an angle of 180° with respect to the rotation axis A of the rotary reaction tube 101*d* has a structure in which a plurality of blades are disposed. When a plurality of blades are disposed as in the above embodiment, a reaction time may be freely adjusted according to a reactive material, a reaction rate, a reaction temperature, a degree of stirring, or the like.

In an example of the present disclosure, the blade attached to the rotary reaction tube may be disposed while rotating by 30° to 180° in a direction from the reactant inlet to the product outlet. The angle may be an angle about the rotation axis. For example, FIGS. 3 and 13 illustrate a structure in which the blades 111 and 111*h* are disposed at an angle of 90° with respect to the rotation axis. The structure may mean a structure in which the blades 111 and 111*h* are disposed while rotating each other by 90° with respect to the rotation axis. FIGS. 8 and 12 may show a structure in which the blades 111*c* and 111*g* are disposed to form an angle of 120° with respect to the rotation axis, and may show a structure in which the blades 111*c* and 111*g* are disposed while rotating by 120° with each other with respect to the rotation axis. FIGS. 7 and 11 may show a structure in which the blades 111*b* and 111*f* are disposed while rotated by 180°. In addition, as shown in FIG. 9, a rotary reaction tube 101*d* according to the present example has a structure in which two blades 111*d* are paired and disposed while a plurality of pairs are rotated by 90° in a direction from the reactant inlet to the product outlet. FIG. 9 illustrates a case in which the paired blades 111*d* are two, but the number of paired blades is not limited thereto, and may be two or more, three or more, and 20 or less. When the paired blades are disposed while rotated by 30° to 180° in a direction from the reactant inlet to the product outlet, the reactive materials may fall sequentially in several stages, allowing for more efficient stirring and gas that can occur inside the reactive material may be discharged smoothly. The rotary reaction tube 101, 101*a*, 101*b*, 101*c*, 101*d*, 101*e*, 101*f*, 101*g*, 101*h*, 101*i*, 101*j*, 101*k*, 101*l*, or 101*m* may be used as the rotary reaction tube 100 shown in FIG. 2.

Figure 1A:
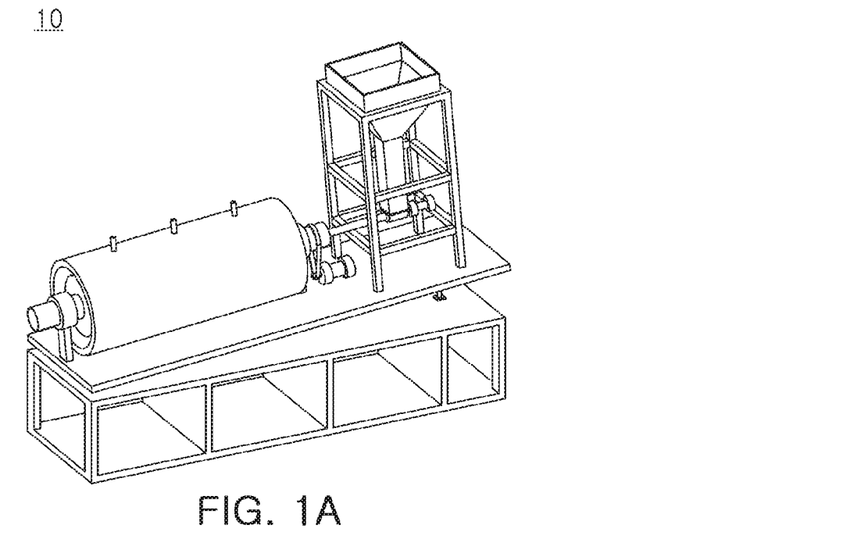
FIG. 1A is a schematic view illustrating an exterior of a continuous tubular reactor according to an embodiment of the present disclosure.
Figure 1B:
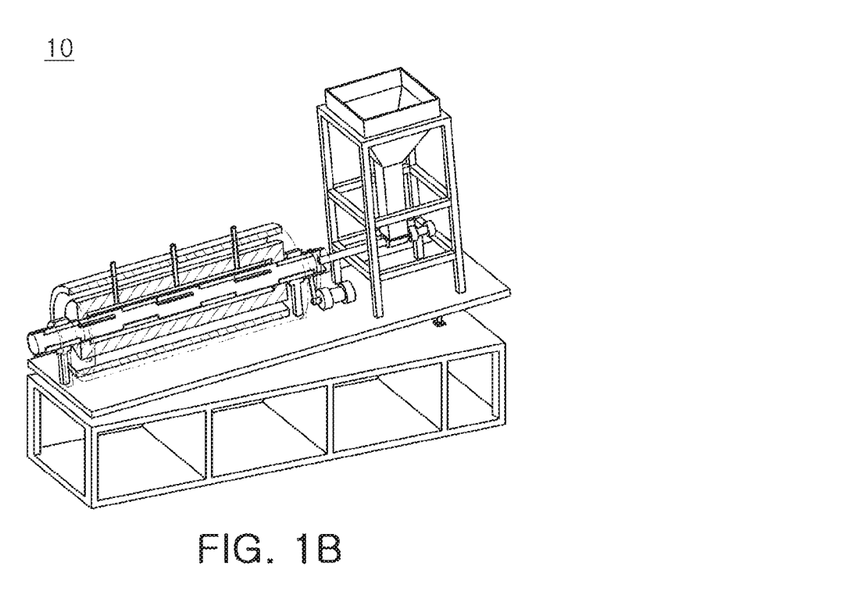
FIG. 1B is a perspective view of the continuous tubular reactor of FIG. 1A.
Figure 2:
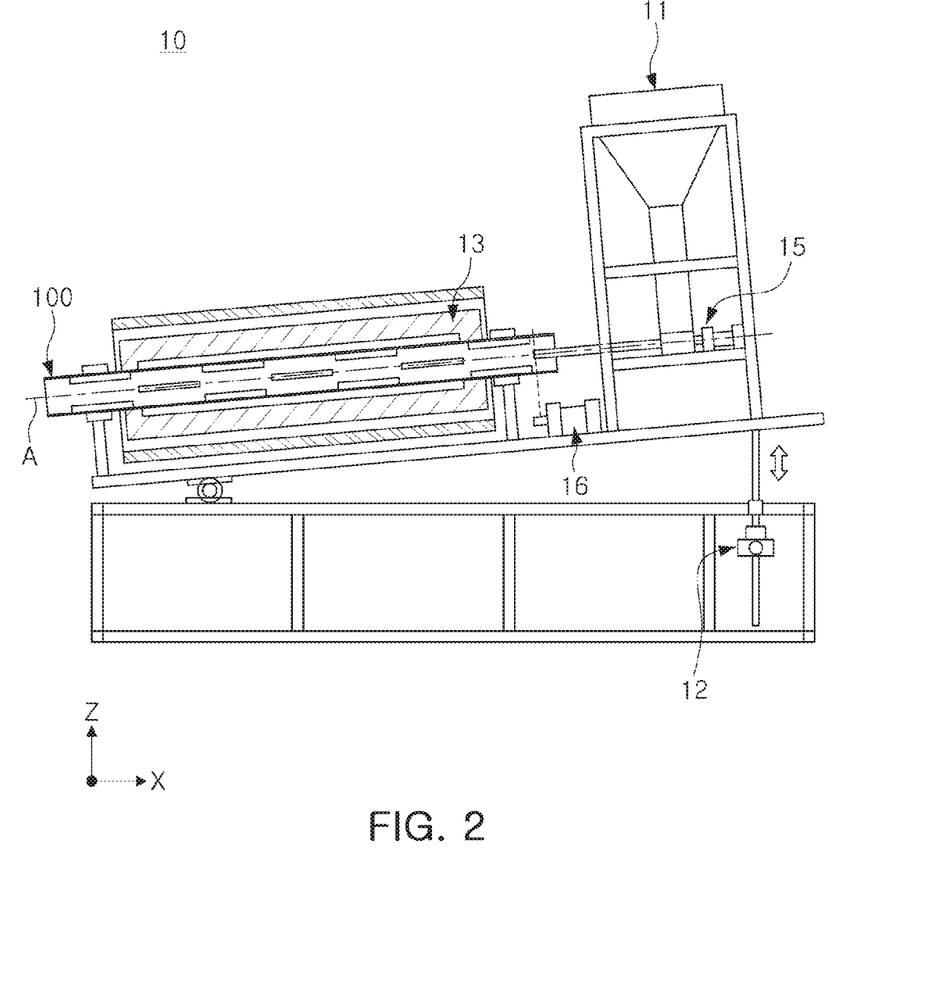
FIG. 2 is a side surface view of the continuous tubular reactor of FIG. 1.

In an embodiment of the present disclosure, a continuous tubular reactor 10 according to the present disclosure may have a heating device 13 disposed therein and surrounding the rotary reaction tube 100. Referring to FIG. 2, the heating device 13 may be attached to a portion of the rotary reaction tube 100, but it may be advantageous for a uniform heat transfer to be disposed in a form surrounding the rotary reaction tube 100. A heating method of the heating device 13 is not particularly limited, but may be, for example, resistance heating, induction heating, microwave heating, infrared heating, laser heating, but is not limited thereto.

In an example of the present disclosure, the continuous tubular reactor according to the present disclosure may include a metered dose 15 which is connected to the reactant inlet of the rotary reaction tube. The metered dose 15 may be a device for adjusting an inflow of a material that is a raw material of the reaction, may be a feeding pump, such as a piston pump or screw pump, but is not limited thereto. The metered dose 15 may induce a uniform reaction by adjusting a dose in consideration of the structure and/or shape of the blade described above, the rotation speed of the rotary reaction tube, and the like.

In an embodiment of the present disclosure, the continuous tubular reactor according to the present disclosure may further include a gas adjusting device. The gas adjusting device may be a device for adjusting a pressure and/or an atmosphere inside the rotary reaction tube, and may be a device in which the inside of the rotary reaction tube is adjusted to nitrogen ($N_2$), oxygen ($O_2$), hydrogen ($H_2$), and water vapor ($H_2O$) and/or inert gas atmospheres, or is adjusted to a vacuum. When the continuous tubular reactor according to the present disclosure includes the gas adjusting device, it may be applied to various reaction processes, and process efficiency may be improved by adjusting the reaction conditions.

In one example, a raw material flowing into the reactant inlet of the rotary reaction tube of the continuous tubular reactor of the present disclosure may include barium (Ba), titanium (Ti), calcium (Ca), strontium (Sr), zirconium (Zr), oxides of lead (Pb), carbonates and/or mixtures thereof. The carbonate as the raw material may mean a compound in which the above-described components such as barium carbonate ($BaCO_3$) are combined with carbonate ions ($CO_3^{2-}$).

In another example, the product exciting the product outlet of the rotary reaction tube of the continuous tubular reactor of the present disclosure may be at least one or more of $(Ba_{1-x}Ca_x)_m(Ti_{1-y}Zr_y)O_3$, $PbTiO_3$ and $SrTiO_3$ ($0 \leq x \leq 1$, $0.995 \leq m \leq 1.010$, $0 \leq y \leq 1$). When x and/or y are not 0 and 1 in $(Ba_{1-x}Ca_x)_m(Ti_{1-y}Zr_y)O_3$, each of the components of the above formula may be in a solid solution state with each other.

In addition to the components, referring to FIG. 2, a continuous tubular reactor 10 may further be provided with a raw material inlet 11 for introducing a raw material of a reaction, a drive motor 16 for adjusting a rotation speed of a rotary reaction tube 100, and the like, but the components may be selectively adjusted according to reaction targets and conditions.

The present disclosure relates to a method of manufacturing barium titanate ($BaTiO_3$).

The method of manufacturing barium titanate ($BaTiO_3$) of the present disclosure may be prepared using the continuous tubular reactor described above. Since the continuous tubular reactor is the same as described above, it will be omitted. The method of manufacturing barium titanate ($BaTiO_3$) of the present disclosure may include an operation of heat treating a raw material by using the continuous tubular reactor.

The following chemical formula shows the reaction formula by a solid phase method of barium titanate ($BaTiO_3$).

$$BaCO_3 + TiO_2 \rightarrow BaTiO_3 + CO_2 \quad (1)$$

$$BaCO_3 + BaTiO_3 \rightarrow Ba_2TiO_4 + CO_2 \quad (2)$$

$$Ba_2TiO_4 + TiO_2 \rightarrow 2BaTiO_3 \quad (3)$$

The reaction is performed at a high-temperature. A method of manufacturing preparing barium titanate ($BaTiO_3$) by mixing barium carbonate ($BaCO_3$) and titanium dioxide ($TiO_2$) powder and then heat treating the mixture thereof, the method is known as a solid phase method. In the case of the solid phase method, there is a problem in that a particle size of the produced particles is not uniform, and it is known that an imbalance of the particles increases in frequency when an intermediate phase such as (2) $Ba_2TiO_4$ of the chemical formula is present.

However, in the method of manufacturing barium titanate ($BaTiO_3$) according to the present disclosure, by using the aforementioned continuous tubular reactor, compared with the solid phase method using a conventional batch reactor, it is possible to reduce the reaction heat distribution of the raw material powder and improve a degassing efficiency, and thus it is possible to manufacture barium titanate($BaTiO_3$) having a high uniformity.

The heat treatment may be performed at 750° C. or higher, 800° C. or higher or 850° C. or higher, and may be performed at a temperature of 1200° C. or lower or 1100° C. or lower, but is not limited thereto.

In an example of the present disclosure, in the method of manufacturing barium titanate ($BaTiO_3$) according to the present disclosure, an operation of milling and/or mixing a raw material before the heat-treatment operation may be further included. The raw material may be milled to a fine size, mixed, and then reacted to prepare barium titanate ($BaTiO_3$) having a narrow particle size distribution.

EXPERIMENTAL EXAMPLE

Barium titanate ($BaTiO_3$) was prepared using the same continuous tubular reactor as shown in FIG. 1. As a raw material for production of barium titanate ($BaTiO_3$) powder, barium carbonate ($BaCO_3$) having a specific surface area of $m^2/g$ and having a particle size of about 100 nm, manufactured by Sakai, Japan, titanium dioxide ($TiO_2$) having a specific surface area of 45 $m^2/g$ and a particle size of about 20 nm, manufactured by Showa Denko, Japan, was used. The raw materials may be obtained from other companies.

The raw material was weighed to a Ba/Ti molar ratio=1, zirconia balls were mixed/dispersed media, ethanol/toluene, a dispersant and a binder were mixed and ball milled for 20 hours. After mixing, the dried mixed powder was calcined at a temperature of 900 to 1000° C.

FIG. 9 is an SEM image of barium titanate ($BaTiO_3$) prepared by a conventional solid phase method, and FIG. 10 is an SEM image of barium titanate ($BaTiO_3$) prepared according to an embodiment of the present disclosure. Referring to FIGS. 9 and 10, compared to FIG. 9 using a conventional solid phase method, it can be confirmed that barium titanate ($BaTiO_3$) synthesized by the solid phase method using a continuous tubular reactor according to an embodiment of the present disclosure has a very small particle size.

Table 1 shows a result of a particle size analysis by a laser diffraction particle size analyzer (LA950, HORIBA, JAPAN).

TABLE 1

|  |  | Comparative Example | Example |
|---|---|---|---|
| Particle Size | D10 | 101 | 110 |
|  | D50 | 148 | 149 |
|  | D90 | 228 | 197 |
|  | D99 | 351 | 201 |
|  | D99/D50 | 2.36 | 1.35 |
|  | CV | 0.36 | 0.24 |

In Table 1, D10, D50, D90 and D99 represent particle diameters corresponding to 10%, 50%, 90% and 99% based on a largest value in a cumulative distribution, respectively. Referring to Table 1, it can be seen that Examples and Comparative Examples according to the present disclosure have a similar value of the particle diameter of D50, but shows a large difference in D10, D90, and D99. This shows that a particle size distribution of Examples manufactured by the solid phase method using the continuous tubular reactor according to the present disclosure is very uniform compared to Comparative Examples manufactured by the conventional solid phase method.

In addition, D99/D50 represents the distribution of coarse particles in the prepared particles, it can be seen that there are very few particles overgrown in Examples compared to Comparative Examples. CV represents a coefficient of variation (CV), which is a standard deviation ($\sigma$) divided by an arithmetic mean ($\bar{x}$), and represents a relative dispersion. A larger CV value means that the relative difference is larger, and it can be seen that Examples of the present disclosure have a narrower particle size distribution than Comparative Examples.

As set forth above, according to an embodiment of the present disclosure, a continuous tubular reactor capable of inducing a uniform reaction and a method of manufacturing barium titanate using the same may be provided.

According to another embodiment of the present disclosure, a continuous tubular reactor capable of performing a stable heat-treatment process and a method of manufacturing barium titanate using the same may be provided. As such, a product, such as barium titanate, may be continuously received at a product outlet of the continuous tubular reactor while providing a raw material at a raw material inlet of the continuous tubular reactor and heating and rotating a rotary reaction tube of the continuous tubular reactor. In one example, at the time when the product, such as barium titanate, is continuously received at the product outlet of the continuous tubular reactor, a rotation axis of the rotary reaction tube may be maintained at a predetermined angle or less with respect to a horizontal surface.

According to another embodiment of the present disclosure, a continuous tubular reactor capable of manufacturing barium titanate having a high uniformity and a method of manufacturing barium titanate using the same may be provided.

However, various and advantageous advantages and effects of the present disclosure are not limited to the above description, and will be more readily understood in the process of describing specific embodiments of the present disclosure.

While this disclosure includes specific examples, it will be apparent to one of ordinary skill in the art that various changes in form and details may be made in these examples without departing from the spirit and scope of the claims and their equivalents.

What is claimed is:

1. A continuous tubular reactor, comprising:
    a rotary reaction tube having a reactant inlet and a product outlet, and containing a ceramic;
    a heating device disposed outside the rotary reaction tube;
    a metered dose connected to the reactant inlet; and
    an angle adjuster adjusting an angle of a rotation axis of the rotary reaction tube relative to a reference and moving the metered dose relative to said reference.

2. The continuous tubular reactor of claim 1, wherein the angle of the rotation axis is 75° or less with respect to a horizontal surface.

3. The continuous tubular reactor of claim 1, wherein the rotary reaction tube comprises one or more selected from a group consisting of an oxide-based ceramic, a nitride-based ceramic, a carbide-based ceramic, a fluoride-based ceramic and a boride-based ceramic.

4. The continuous tubular reactor of claim 1, wherein a blade is disposed on an inner wall of the rotary reaction tube.

5. The continuous tubular reactor of claim 4, wherein a ratio (h/r) of a height h of the blade to a radius r of an inner diameter of the rotary reaction tube is in a range of 0.01 or more and 0.5 or less.

6. The continuous tubular reactor of claim 4, wherein the blade is disposed in a direction parallel to a rotation axis of the rotary reaction tube.

7. The continuous tubular reactor of claim 4, wherein the blade is disposed in a direction perpendicular to a rotation axis of the rotary reaction tube.

8. The continuous tubular reactor of claim 4, wherein the blade is disposed in a spiral direction with respect to a rotation axis of the rotary reaction tube.

9. The continuous tubular reactor of claim 1, wherein a plurality of blades are disposed on an inner wall of the rotary reaction tube.

10. The continuous tubular reactor of claim 9, wherein the plurality of blades are disposed while rotated by 30° to 180° in a direction from the reactant inlet to the product outlet.

11. The continuous tubular reactor of claim 4, wherein the blade comprises one or more selected from a group consisting of an oxide-based ceramic, a nitride-based ceramic, a carbide-based ceramic, a fluoride-based ceramic and a boride-based ceramic.

12. The continuous tubular reactor of claim 1, wherein an inner wall of the rotary reaction tube comprises one or more selected from a group consisting of an oxide-based ceramic, a nitride-based ceramic, a carbide-based ceramic, a fluoride-based ceramic and a boride-based ceramic.

13. The continuous tubular reactor of claim 1, wherein an inner wall of the rotary reaction tube comprises quartz.

14. The continuous tubular reactor of claim 1, wherein the heating device surrounds the rotary reaction tube.

15. The continuous tubular reactor of claim 1, further comprising a gas adjusting device configured to adjust an inside of the rotary reaction tube to an atmosphere of nitrogen ($N_2$), oxygen ($O_2$), hydrogen ($H_2$), water vapor ($H_2O$) and/or inert gas, or to a vacuum.

16. The continuous tubular reactor of claim 1, wherein a raw material flowing into the reactant inlet comprises barium (Ba), titanium (Ti), calcium (Ca), strontium (Sr), zirconium (Zr), oxides of lead (Pb), carbonates and/or mixtures thereof.

17. The continuous tubular reactor of claim 1, wherein a product flowing out to the product outlet is at least one or more of $(Ba_{1-x}Ca_x)_m(Ti_{1-y}Zr_y)O_3$, $PbTiO_3$ or $SrTiO_3$ ($0 \leq x \leq 1$, $0.995 \leq m \leq 1.010$, $0 \leq y \leq 1$).

18. A method, comprising an operation of:
    heat treating a reactive material using the continuous tubular reactor of claim 1.

19. The method of claim 18, further comprising operations of:
    providing, at the reactant inlet, the reactive material comprising barium (Ba), titanium (Ti), calcium (Ca), strontium (Sr), zirconium (Zr), oxides of lead (Pb), carbonates and/or mixtures thereof, while rotating and heating the rotary reaction tube; and
    receiving, at the product outlet, a product comprising one or more of $(Ba_{1-x}Ca_x)_m(Ti_{1-y}Zr_y)O_3$, $PbTiO_3$ or $SrTiO_3$ ($0 \leq x \leq 1$, $0.995 \leq m \leq 1.010$, $0 \leq y \leq 1$), while rotating and heating the rotary reaction tube.

* * * * *